UNITED STATES PATENT OFFICE.

HERMANN V. D. HEIDE, OF DATTELN, GERMANY, ASSIGNOR TO THE FIRM OF WUNNER'SCHE BITUMENWERKE G. M. B. H., OF DATTELN, GERMANY.

PROCESS OF THE MANUFACTURE OF INSULATING MATERIALS.

No. 903,287.

Specification of Letters Patent.

Patented Nov. 10, 1908.

Application filed May 31, 1907. Serial No. 376,711.

*To all whom it may concern:*

Be it known that I, HERMANN VON DER HEIDE, doctor of philosophy, chemist, a subject of the King of Prussia, German Emperor, residing at Datteln, Province of Westphalia, Kingdom of Prussia, German Empire, have invented new and useful Improvements in Processes of Manufacture of Insulating Materials, of which the following is a specification.

The present invention refers to the manufacture of insulating materials, which can be used as an insulating cement for building and similar purposes in order to prevent the entrance or exit of moisture.

The process consists in emulsifying a mixture of pitch and heavy coal tar oils with substances of alkaline substances as alkali hydroxids or alkali carbonates and oxidizing the emulsion by means of inorganic oxidizing oxids.

In the place of pitch and coal tar oils one can use asphaltum, the residues of the petroleum distillation, resins, fats, paraffin and where reference is hereafter made to pitch and coal tar oils I intend to include also these equivalents. One may also mix the said substances with the mixture of pitch and coal tar oils. The skilled workman will select the substances according to their costs and their consistency.

As inorganic oxidizing oxids the superoxids have been found as very suitable. Especially the superoxids of the alkali metals or earth alkali metals are very suitable, for instance barium superoxid. Other inorganic oxidizing substances suitable for the purposes of the present invention are: superoxid of lead, litharge, superoxid of manganese, magnesium, sodium.

The product of my process is used for building purposes by mixing the insulating material with building materials as Portland or hydraulic cement and like substances. It is useful to mix the product with substances which will react with the building materials. If Portland cement is used as building material an admixture of water glass is very suitable.

In order to illustrate the manner, in which my invention may be carried out, I quote the following example: 200 kilograms of pitch (coal tar pitch) and 600 kilograms of heavy coal tar oils are mixed with 24 kilograms of calcined carbonate of sodium, 50 kilograms of water and 340 kilograms of sodium—or potassium—water glass, until a uniform emulsion will be formed. Then one adds 23 kilograms of superoxid of barium. One may also add to the product filling substance as sand.

I claim:

1. The process for manufacturing an insulating building material which consists in mixing pitch and heavy coal tar oils, emulsifying the said mixture with a solution of alkaline reaction and oxidizing the said emulsion with an inorganic oxid.

2. The process for manufacturing an insulating building material which consists in mixing pitch and heavy coal tar oils, emulsifying the said mixture with a solution of alkaline reaction and with a substance reacting with cement and oxidizing the said emulsion with an inorganic oxid.

3. The process for manufacturing an insulating building material which consists in mixing pitch and heavy coal tar oils, emulsifying the said mixture with a solution of alkaline reaction and oxidizing the said emulsion with superoxid of barium.

4. The process for manufacturing an insulating building material which consists in mixing pitch and heavy coal tar oils, emulsifying the said mixture with a solution of alkaline reaction and water glass and oxidizing the said emulsion with superoxid of barium.

5. An insulating building material consisting of an oxidized emulsion of pitch and heavy coal tar oils in an alkaline solution.

6. An insulating building material consisting of an oxidized emulsion of pitch and heavy coal tar oils in a solution containing water glass and having an alkaline reaction.

7. An insulating building material consisting of an emulsion of pitch and heavy coal tar oils in a solution having an alkaline reaction and oxidized by means of superoxid of barium.

8. The process of manufacturing an insulating building material which consists in mixing pitch, heavy coal tar oils, emulsifying the same in a solution containing calcined carbonate of soda and water glass and then adding an inorganic oxid to the emulsion to oxidize the same.

9. The process of manufacturing an insulating building material, which consists in emulsifying a mixture composed of 200 parts of pitch and 600 parts of heavy coal tar oil, in a solution composed of 50 parts of water 24 parts of calcined carbonate of soda and 340 parts of water glass and then oxidizing the emulsion by adding thereto 23 parts of an inorganic oxid.

10. An insulating building material consisting of an emulsion of pitch and heavy coal tar oils in a solution having an alkaline reaction and containing a substance reacting with cement, and oxidized by means of an inorganic oxid.

In witness whereof I have hereunto signed my name this 11th day of May, 1907, in the presence of two subscribing witnesses.

HERMANN V. D. HEIDE.

Witnesses:
  ALFRED POHLMEYER,
  M. ENGELS.